(12) United States Patent
Treat

(10) Patent No.: US 7,017,847 B2
(45) Date of Patent: Mar. 28, 2006

(54) CARGO STRAP WINDING APPARATUS

(76) Inventor: James T. Treat, 3091 Yankee, Niles, MI (US) 49120

( * ) Notice: Subject to any disclaimer, the term of this patent is extended or adjusted under 35 U.S.C. 154(b) by 0 days.

(21) Appl. No.: 10/700,134

(22) Filed: Nov. 3, 2003

(65) Prior Publication Data

US 2005/0092862 A1    May 5, 2005

(51) Int. Cl.
*B65H 75/30* (2006.01)
(52) U.S. Cl. .................. 242/395; 242/399; 242/404; 410/100; 410/103
(58) Field of Classification Search ............. 242/395, 242/395.1, 398, 399, 399.2, 404, 406; 410/100, 410/103
See application file for complete search history.

(56) References Cited

U.S. PATENT DOCUMENTS 4,311,288 A * 1/1982 Galland .................... 242/532.6
5,853,164 A * 12/1998 Hunt ........................ 254/213
5,961,061 A * 10/1999 Stanley ..................... 242/395

* cited by examiner

*Primary Examiner*—John Q. Nguyen
(74) *Attorney, Agent, or Firm*—R. Tracy Crump

(57) ABSTRACT

A winding apparatus (winder) that is used to quickly and conveniently wind cargo straps into individual coils for storage from conventional strap winches is disclosed. The winder has a two piece design, which includes a "jawbone" shaped cantilever and a removable crank. The "jawbone" configuration of the cantilever is created by its toothed tapered sides at its front and the pair of spaced parallel ears at its rear. The removable crank can be fitted to the cantilever in a winding position inserted between the two ears or in a storage position secured within the front section of the cantilever. The cantilever is mounted to the strap winch in a plurality of positions to ensure that the rear of the cantilever extends beyond the edge of the trailer bed providing easy access to the crank in its winding position. One end of a cargo strap is secured to the crank, which is fitted to the cantilever and the crank is manually turned to wind the cargo straps into a coil.

13 Claims, 4 Drawing Sheets

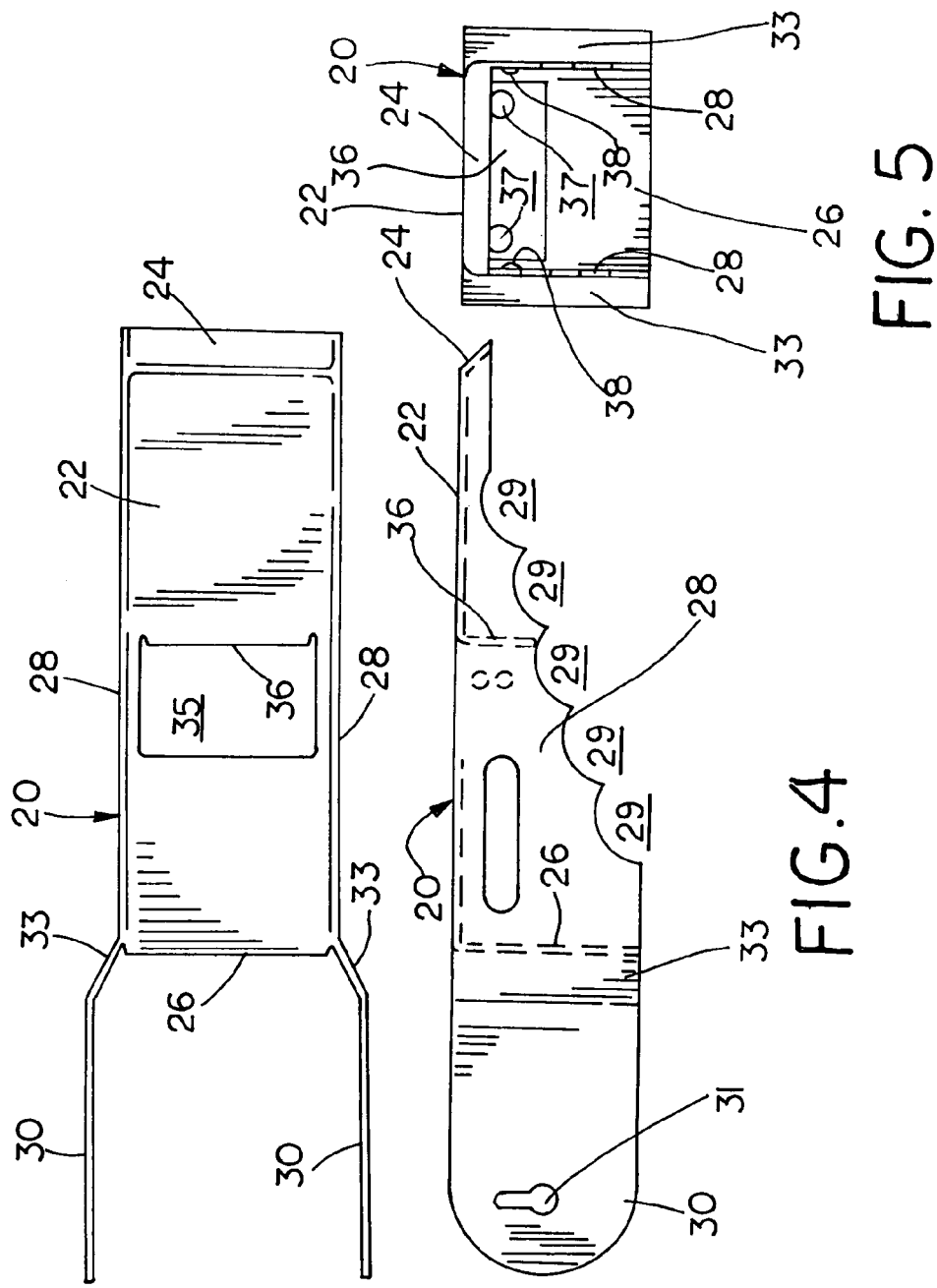

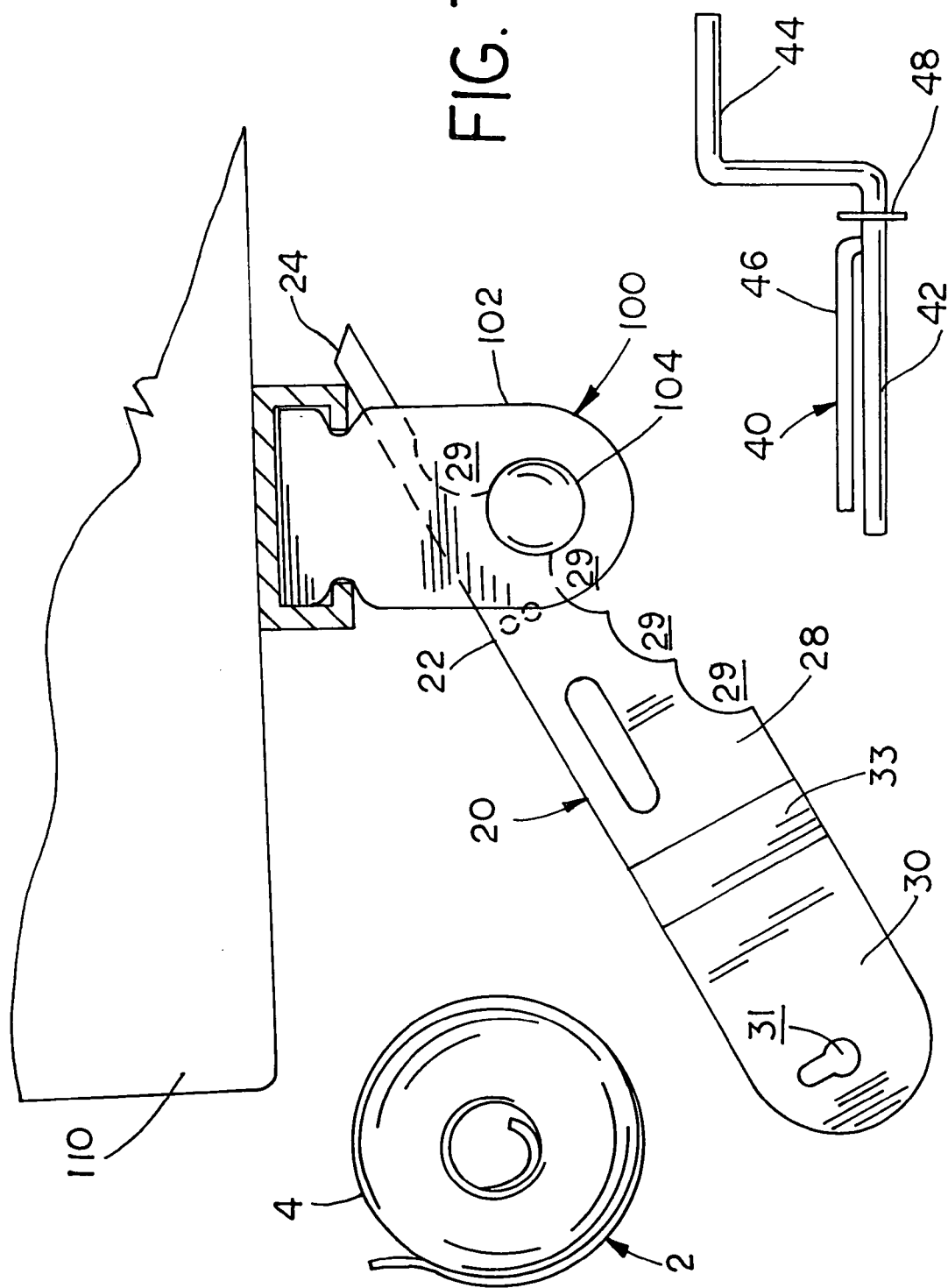

CARGO STRAP WINDING APPARATUS

This invention relates to an apparatus for winding cargo straps into individual coils for storage and in particular, a winding apparatus used with strap winches mounted beneath trailer beds.

BACKGROUND OF INVENTION

Cargo straps (webs) and web winches are familiar tools and commonly use to secure material and equipment atop flat bed tractor trailers. Strap winches are often permanently mounted to flat bed trailers along their sides beneath the beds. Strap winches incorporate a rotating drum around which the cargo strap is wound and rachet mechanisms that allow the strap to be drawn down taut. Generally, the ratchet mechanism is hand operated, which requires the user to use a lever tool, such as a crowbar, to turn a collar that rotates the drum to wind and tension the cargo strap.

When not in use, cargo straps are typically wound onto the winch drums for storage. Winding and storing individual cargo straps onto the strap winches is time consuming and troublesome. Strap winches are designed to draw the strap taut to secure the equipment or material using the leverage of a crowbar or other lever tool. Strap winches are not designed to quickly wind long cargo straps for storage. It is difficult to hand turn the collar that winds the strap drum, and manipulating a crowbar to turn the collar is inefficient for simply winding the straps for storage. The difficulty is compounded by the fact that strap winches are often mounted beneath the flat bed trailers, which limits access to the winches.

Cargo strap theft is a frequent occurrence and a serious inconvenience, particularly for flat bed trailer operators. Cargo straps stored on the strap winches are visible and accessible to thieves making them easily stolen. Replacing stolen cargo straps is costly. Furthermore, storing the webs on the winches also exposes the webs to the elements. In winter, snow and ice adhere to the webs and make using the webs difficult. Ideally, cargo webs should be quickly wound into rolls and stored inside the truck cab or some locked storage bin on the trailer or cab.

To deter cargo web theft and conveniently store cargo webs, a convenient winding apparatus is needed. The winding apparatus must be stowable within the truck cab or storage bins and easy to use. The winding apparatus should wind the webs into coils directly off the web winches without tangling or soiling the webs on the ground.

SUMMARY OF INVENTION

The winding apparatus (winder) of this invention is used to quickly and conveniently wind cargo straps into individual coils for storage from conventional strap winches. The winder has a two piece design, which includes a "jawbone" shaped cantilever and a removable crank. The "jawbone" configuration of the cantilever is created by its toothed tapered sides at its front and the pair of spaced parallel ears at its rear. The removable crank can be fitted to the cantilever in a winding position inserted between the two ears or in a storage position secured within the front section of the cantilever.

To wind a cargo strap, the cantilever is mounted to the web winch. The weight of the cantilever creates a lever moment, which holds the cantilever in place within the strap winch. The cantilever can be mounted to the strap winch in a plurality of positions to ensure that the rear of the cantilever extends beyond the edge of the trailer bed providing easy access to the crank in its winding position. Once the cantilever is mounted to the strap winch, the crank is fitted to the cantilever between the two ears. One end of a cargo strap is secured to the crank shaft and the crank is manually turned to wind the cargo straps into a coil. Once the entire length of the cargo strap is wound, the crank is withdrawn from the cantilever, which also withdraws the crank shaft from the new coiled strap. When winding is complete, the cantilever is removed from the strap winch and the crank is fitted to the cantilever in its storage position for future use.

Accordingly, one advantage of this invention is that it quickly and conveniently winds cargo straps into individual coils for safe and secure storage.

Another advantage is that the winder can be used with conventional strap winches.

Another advantage is that the removable crank can be readily stored in the cantilever.

Another advantage is that the cantilever can be mounted to a strap winch so that the crank is readily accessible to a user, regardless of how deep the strap winch is mounted to the trailer bed.

Another advantage is that the winder is not permanently fixed to a strap winch and can be used to wind individual cargo straps from multiple strap winches.

Another advantage is that the cantilever is only suspended from the strap winches and the winder winds the cargo strap into coils without operating the winch mechanism.

Other advantages of this invention will become apparent upon a reading of the following description.

BRIEF DESCRIPTION OF THE DRAWINGS

The preferred embodiments of the invention have been depicted for illustrative purposes only wherein:

FIG. 2 is a top plan view of the cantilever;

FIG. 3 is a rear elevation view of the cantilever;

FIG. 4 is a side elevation view of the cantilever;

FIG. 5 is a front elevation view of the cantilever;

FIG. 7 is a side elevation view of the winder illustrating the cantilever mounted to a strap winched, which is mounted from the edge of a trailer bed, a coiled cargo strap and the crank, which is withdrawn from the cantilever.

DESCRIPTION OF THE PREFERRED EMBODIMENT

Figure 1:
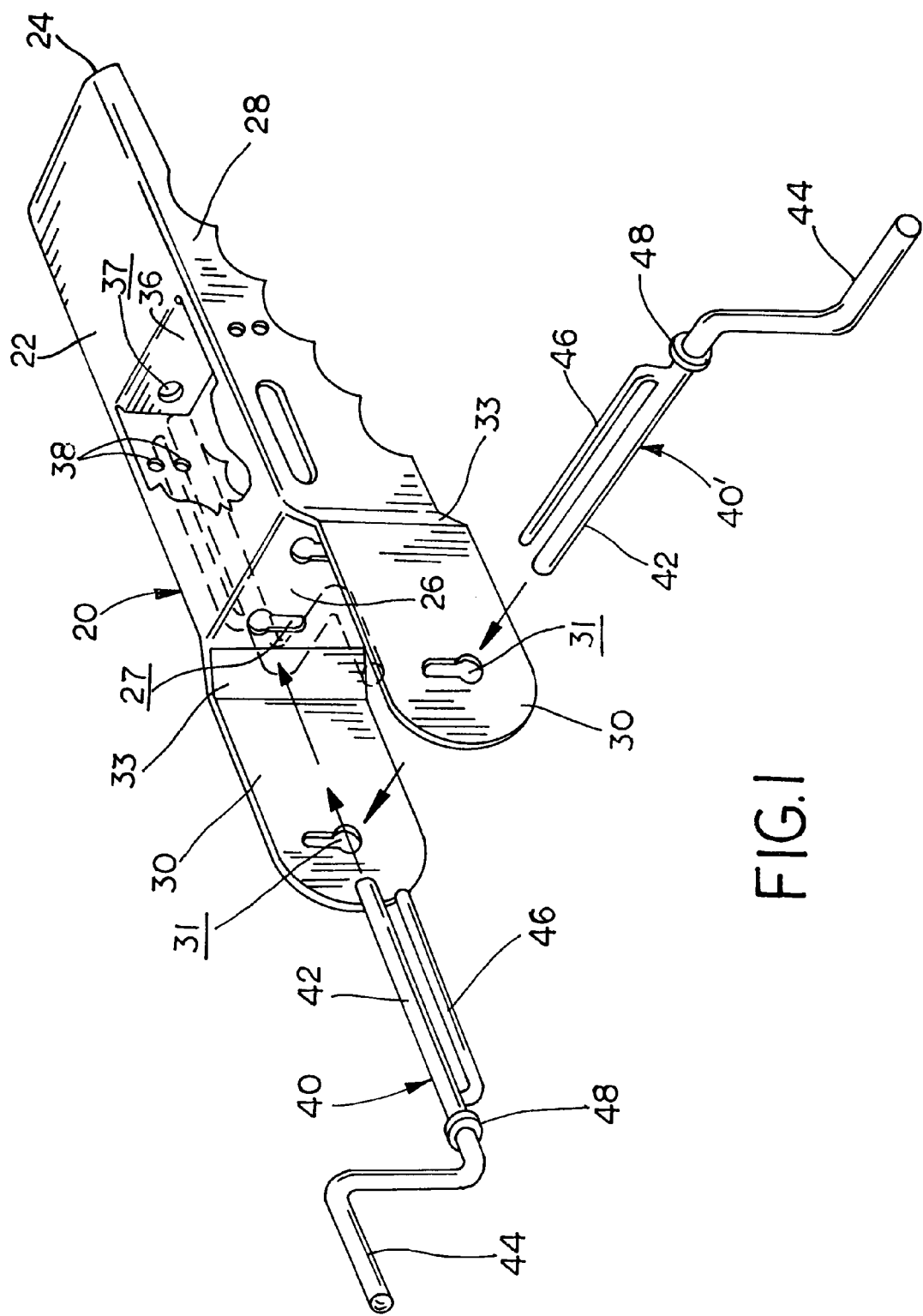
FIG. 1 is an exploded perspective view of the winder of this invention illustrating two cranks fitted to the cantilever.

The preferred embodiments herein described are not intended to be exhaustive or to limit the invention to the precise form disclosed. They are chosen and described to explain the invention so that others skilled in the art might utilize its teachings.

The winding apparatus (winder) of this invention is designated in the figures generally as reference numeral 10. Winder 10 is used to conveniently and quickly coil cargo straps 2 from web winches 100 into individual coiled rolls 4 for storage and safekeeping. Winder 10 is designed to be used with conventional cargo straps and web winches, such as the ones manufactured by Kinedyne, Inc. As shown, cargo strap 2 is a length of cloth or nylon webbing designed to be wound onto strap winch 100. Strap winch 100 is mounted to the bottom of a flat bed trailer and includes a U-shaped frame 102 and strap drum 104 around which the strap is wound and tensioned.

As shown in FIG. 1, winder 10 has a two piece design, which includes a cantilever 20 and a removable crank 40. Typically, cantilever 20 is stamped and formed from a sheet of sturdy rigid metal, such as steel or aluminum, which can be hardened and treated to increase rigidity and durability and to reduce rust and corrosion. Alternatively, cantilevers may be constructed from reinforced polymers and fiberglass, or any other suitable material that provides sufficient strength and durability for rugged commercial use. Crank 40 is constructed of a steel or aluminum rod stock, which can be welded as well as, hardened and treated to increase rigidity and durability and to reduce rust and corrosion.

As shown in FIGS. 1–5, cantilever 20 has a shape similar in appearance to the "jawbone" of an alligator. Cantilever 20 includes a flat top 22, an angled front lip 24, a back plate 26, a front plate 36 and two tapered sides 28. As shown, jaw sides 28 taper toward front lip 24. Each tapered side 28 has a toothed bottom edge, which is formed by a plurality of round scallops 29. Jaw sides 28 extend past back plate 26 to form two spaced parallel ears 30. The toothed bottom edge of tapered sides 28 and ears 30 create the "jawbone" configurations of cantilever 20. Ears 30 are parallel to each other and have a short joggle 33 which spaces the ear parts at a width slightly greater than the width of top 22. Each ear 30 has a "key hole" opening 31. Key holes 31 are aligned to receive crank 40. Top 22 has an opening 35 formed by a rectangular section of the top, which is cut and bent downward to form front plate 36. Back plate 26 has two spaced key hole openings 27. Front plate 36 has two circular through bores 37 that are axially aligned with one of the key hole opening 27 in back plate 26. A pair of vertically oriented detents 38 are formed in each jaw side 28, which protrude inward facing the opposite side. Crank 40 has two bends that form a crank shaft 42 and a handle 44. A J-shaped strap bar 46 is welded to crank shaft 42 so that the length of the strap bar is spaced from and parallel to the crank shaft. An annular stop 48 is welded to crank shaft 42 between handle 44 and strap bar 46.

As shown in FIG. 1, crank 40 can be fitted to cantilever 20 in a winding position or a storage position. To fit crank 40 to cantilever 20 in the winding position, crank shaft 42 and strap bar 46 are inserted through keyhole opening 31 of either ear 30 so that the distal end of the crank shaft extends through key hole opening 31 of opposite ear 30 and stop 48 abuts the first ear. To secure crank 40 to cantilever 20 in its storage position, crank shaft 42 and strap bar 46 is inserted through one of keyholes 27 in back plate 26 so that the distal end of crank shaft 46 extends through the opposite facing hole 37 in front plate 36 and stop 48 abuts the back plate. With crank shaft 46 passing through both holes 27 and 37 in the back and front plates 26 and 36, crank 40 is rotated ninety degrees to secure strap bar 46 between detents 38 in sides 28. Rotating crank 40 ninety degrees rotates strap bar 46 out of axial alignment with the slot in key hole 27, which prevents crank 40 from being withdrawn from cantilever 20. In addition, rotating the crank 90 degrees secures strap bar 46 between detents 38, which prevents further rotation of the crank. Strap bar 46 has sufficient flex and resilience to allow the user to selectively rotate crank 40 to snap fit the strap bar into and out of its locked position between detents 38.

Figure 6:
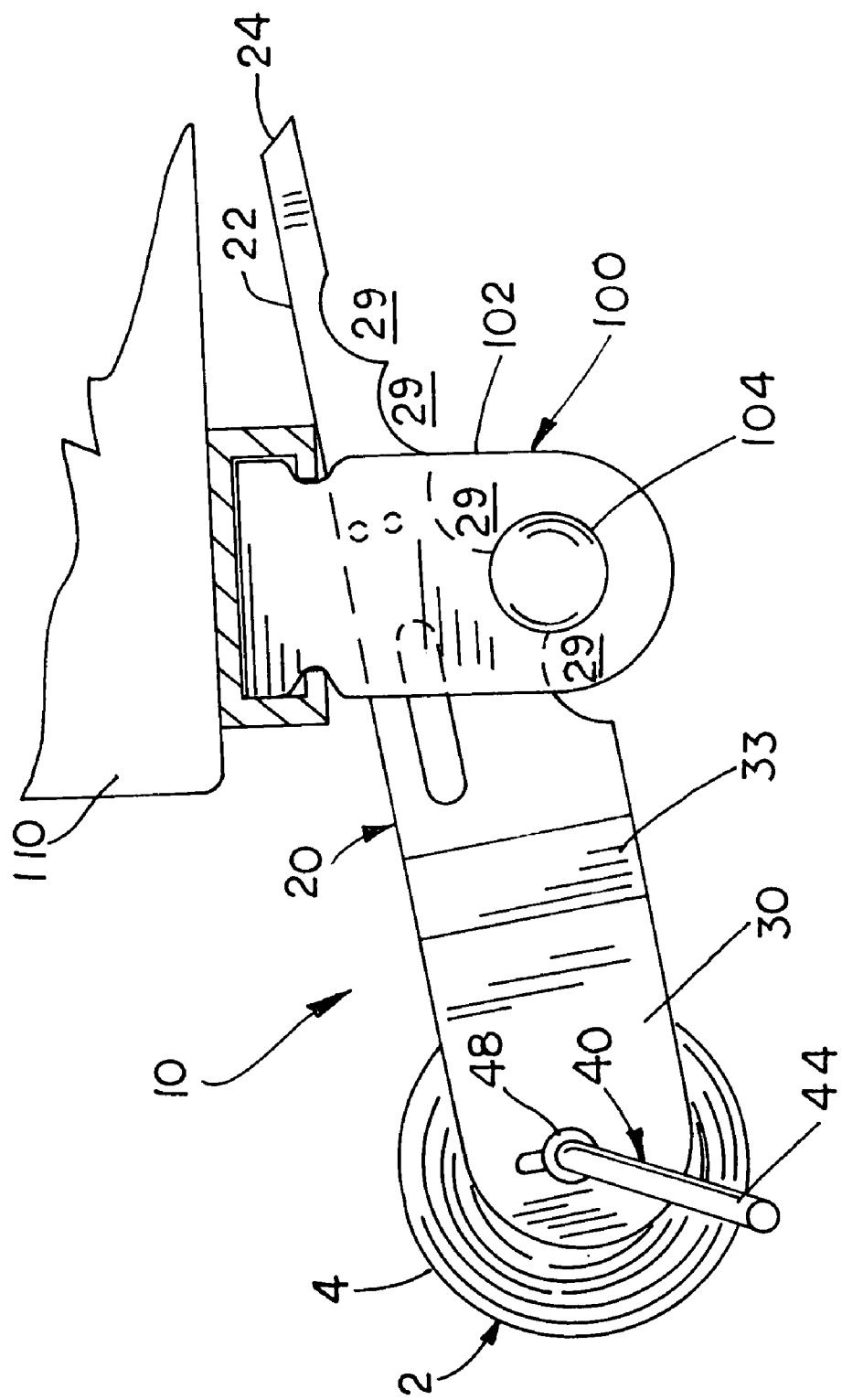
FIG. 6 is a side elevation view of the winder illustrating the cantilever mounted to a strap winched, which is mounted near the edge of a trailer bed and a cargo strap coiled around the crank, which is fitted to the cantilever in its winding position.

FIGS. 6 and 7 illustrate winder 10 used with strap winch 4 to wind cargo straps into coils. Cantilever 20 is temporarily mounted to strap winch 100 by inserting the proximal (front) end of cantilever 20 between U-frame 102 and strap drum 104. The weight of cantilever 20 creates a lever moment, which holds the cantilever in place within strap winch 4. As shown in FIGS. 6 and 7, cantilever 20 can be mounted to strap winch 100 in a plurality of positions so that the distal (back) end of the cantilever extends past the edge of trailer bed 110. In each mounting position, cantilever 20 rests atop strap drum 104 with the drum seated within one of the scallops 29 formed in the bottom edge of sides 28. Crank 40 is fitted to cantilever 20 in its winding position. One end of cargo strap 2 is secured to strap bar 46 and crank 40 is manually turned to wind cargo strap 2 into a coil 4. Once the entire length of cargo strap 2 is wound, crank 40 is withdrawn from cantilever 20, which also withdraws the crank from the newly coiled strap. When winding is complete, cantilever 20 is removed from strap winch 100 and crank 40 is fitted to cantilever 20 in its storage position for future use.

ADVANTAGES

One skilled in the art will note several advantages of the winder apparatus of this invention. The winder of this invention quickly and conveniently winds cargo straps into individual coils for safe and secure storage. The winder can be used with conventional strap winches and winds the cargo strap into coils without operating the winch mechanism. The winder is not permanently fixed to a strap winch and can be used to wind individual cargo straps from multiple strap winches. The removable crank and cantilever are relatively compact in design and are constructed to be sturdy durable tools that can be easily operated and stored. The removable crank can be secured within the cantilever for convenient storage.

It is also important to note that the cantilever can be mounted to a strap winch so that the crank is readily accessible to a user, regardless of how deep the strap winch is mounted to the trailer bed. The plurality of scallops formed in the bottom edge of the sides allows the cantilever to be seated atop the strap drum of a winch in a number of positions so that the rear of the cantilever is readily accessible. When a strap winch is mounted beneath a trailer bed far from the edge of the trailer, the cantilever can be mounted to the winch with the drum seat in one of the first scallops near the front of the cantilever. Conversely, if the winch is mounted near the edge of the trailer, the cantilever can be inserted further into the winch.

It is understood that the above description does not limit the invention to the details given, but may be modified within the scope of the following claims.

I claim:

1. A winding apparatus for winding an elongated cargo strap into a coil, which is used with a strap winch that is mounted beneath a trailer, where the strap winch includes a U-shaped bracket having two spaced legs connected by an integral cross member and a drum suspended between the legs around which the cargo strap is wound and tensioned during normal use, the winding apparatus comprising: an elongated cantilever; and a removable crank, the cantilever having a first end and a second end, the first end of the cantilever being adapted for mounting to the strap winch, so that the second end of the cantilever extends laterally beyond the trailer when the cantilever is connected to the strap winch, the second end of the cantilever being adapted for receiving the crank in a winding position, so that the crank may be manually turned to wind the cargo strap into the coil around the crank, the cantilever includes sides having a plurality of scallops formed along a bottom edge thereof, the first end of the cantilever restrictively held to the strap winch with the drum seating within one of the plurality of scallops when the cantilever is mounted to the strap winch, whereby the plurality of scallops constitutes means for selectively seating the cantilever to the strap winch in one of a plurality of mounting positions.

2. The winding apparatus of claim 1 wherein the crank includes an elongated shaft, a handle extending from the shaft, and an elongated strap bar extending from the shaft so that the strap bar is spaced over the shaft and extends axially parallel to the shaft.

3. The winding apparatus of claim 1 wherein the second end of the cantilever includes a pair of spaced ears, each of the pair of ears has an opening therein for receiving the crank, whereby the cargo strap is wound around the crank into the call between the pair of ears when the crank is fitted to the second end of the cantilever and manually turned.

4. The winding apparatus of claim 1 wherein the first end of the cantilever also being adapted for receiving the crank in a storage position therein when not used to wind the cargo strap into the coil.

5. The winding apparatus of claim 4 wherein the first end of the cantilever includes a first plate and a second plate, each of the first plate and the second plate having an opening therethrough, the crank extends through the openings in the first and second plates when in the storage position.

6. The winding apparatus of claim 5 wherein the cantilever also includes a side, the side having two detents protruding therefrom, the crank includes an elongated shaft, a handle extending from the shaft, and an elongated strap bar extending from the shaft so that the strap bar is spaced over the shaft and extends axially parallel to the shaft, the strap bar overlying the side and restrictively seated between the two detents to secure the crank to the cantilever when in the storage position.

7. A winding apparatus for winding an elongated cargo strap into a coil, which is used with a strap winch that is mounted beneath a trailer, where the strap winch includes a U-shaped bracket having two spaced legs connected by an integral cross member and a drum suspended between the legs around which the cargo strap is wound and tensioned during normal use, the winding apparatus comprising: an elongated cantilever; and a removable crank, the cantilever having a first end and a second end, the first end of the cantilever being adapted for mounting to the strap winch, so that the second end of the cantilever extends laterally beyond the trailer when the cantilever is connected to the strap winch, the cantilever also includes a side, the side having two detents protruding therefrom, the first end of the cantilever also being adapted for receiving the crank in a storage position therein when not used to wind the cargo strap into the coil, the first end of the cantilever includes a first plate and a second plate, each of the first plate and the second plate having an opening therethrough, the crank extends through the openings in the first and second plates when in the storage position, the second end of the cantilever being adapted for receiving the crank in a winding position, so that the crank may be manually turned to wind the cargo strap into the coil around the crank, the crank includes an elongated shaft, a handle extending from the shaft, and an elongated strap bar extending from the shaft so that the strap bar is spaced over the shaft and extends axially parallel to the shaft, the strap bar overlying the side and restrictively seated between the two detents to secure the crank to the cantilever when in the storage position.

8. In combination, a strap winch mounted beneath a trailer and including a U-shaped bracket having two spaced legs connected by an integral cross member and a drum suspended between the legs around which the cargo strap is wound and tensioned during normal use; and a winding apparatus used in association with the strap winch for winding the cargo straps into a coil and including an elongated cantilever and a removable crank, the cantilever having a first end and a second end, the first end of the cantilever being adapted for mounting to the strap winch, so that the second end of the cantilever extends laterally beyond the trailer when the cantilever is connected to the strap winch, the second end of the cantilever being adapted for receiving the crank in a winding position, so that the crank may be manually turned to wind the cargo strap into the coil around the crank, the cantilever includes sides having a plurality of scallops formed along a bottom edge thereof, the first end of the cantilever restrictively held to the strap winch with the drum seating within one of the plurality of scallops when the cantilever is mounted to the strap winch, whereby the plurality of scallops constitutes means for selectively seating the cantilever to the strap winch in one of a plurality of mounting positions.

9. The winding apparatus of claim 8 wherein the crank includes an elongated shaft, a handle extending from the shaft, and an elongated strap bar extending from the shaft so that the strap bar is spaced over the shaft and extends axially parallel to the shaft.

10. The winding apparatus of claim 8 wherein the second end of the cantilever includes a pair of spaced ears, each of the pair of ears has an opening therein for receiving the crank, whereby the cargo strap is wound around the crank into the coil between the pair of ears when the crank is fitted to the second end of the cantilever and manually turned.

11. The winding apparatus of claim 8 wherein the first end of the cantilever also being adapted for receiving the crank in a storage position therein when not used to wind the cargo strap into the coil.

12. The winding apparatus of claim 11 wherein the first end of the cantilever includes a first plate and a second plate, each of the first plate and the second plate having an opening therethrough, the crank extends through the openings in the first and second plates when in the storage position.

13. The winding apparatus of claim 12 wherein the cantilever also includes a side, the side having two detents protruding therefrom, the crank includes an elongated shaft, a handle extending from the shaft, and an elongated strap bar extending from the shaft so that the strap bar is spaced over the shaft and extends axially parallel to the shaft, the strap bar overlying the side and restrictively seated between the two detents to secure the crank to the cantilever when in the storage position.

\* \* \* \* \*